United States Patent [19]

Sakurai et al.

[11] Patent Number: 4,681,726
[45] Date of Patent: Jul. 21, 1987

[54] FAST BREEDER REACTOR

[75] Inventors: Akio Sakurai, Kashiwa; Ryoichi Kato, Hitachi, both of Japan

[73] Assignees: Central Research Institute of Electric Power Industry; Hitachi, Ltd., both of Tokyo, Japan

[21] Appl. No.: 663,981

[22] Filed: Oct. 23, 1984

[30] Foreign Application Priority Data

Oct. 24, 1983 [JP] Japan ................. 58-197696

[51] Int. Cl.[4] .................. G21G 1/04; G21C 9/00
[52] U.S. Cl. .................... 376/171; 376/290; 376/293; 376/302
[58] Field of Search .......... 376/171, 285, 290, 293, 376/302, 402, 403, 404, 405, 406

[56] References Cited

U.S. PATENT DOCUMENTS

| | | | |
|---|---|---|---|
| 3,400,046 | 9/1968 | Barker ................... | 376/405 |
| 4,087,325 | 5/1978 | Chevallier et al. ........ | 376/203 |
| 4,351,794 | 9/1982 | Artaud et al. ........... | 376/404 |
| 4,367,194 | 1/1983 | Schenewerk et al. ....... | 376/281 |
| 4,581,199 | 4/1986 | Bioret et al. ........... | 376/285 |

FOREIGN PATENT DOCUMENTS

| | | |
|---|---|---|
| 0004218 | 9/1979 | European Pat. Off. . |
| 0055963 | 7/1982 | European Pat. Off. . |
| 2180517 | 11/1973 | France . |
| 2221791 | 10/1974 | France . |
| 49-15895 | 2/1974 | Japan . |
| 2000356 | 1/1979 | United Kingdom . |

OTHER PUBLICATIONS

Holmes, "Proceedings of the L.M.F.B.R. Safety Topical Meeting", vol. 1, pp. 475-491, 1982.
Banal et al, "Nuclear Engineering International", vol. 23, No. 272, pp. 43-60, 1978.

Primary Examiner—Herbert B. Guynn
Assistant Examiner—Eric Jorgensen
Attorney, Agent, or Firm—Antonelli, Terry & Wands

[57] ABSTRACT

A fast breeder reactor has a nuclear reactor container filled with a liquid metal, a reactor core disposed within the nuclear reactor container, and a first supporting structural member which is mounted to the nuclear reactor container such as to support the reactor core. The fast breeder reactor is provided with a cylindrical structural member which surrounds the periphery of the reactor core such as to define an annular gap between the cylindrical structural member and the reactor core for allowing the liquid metal to exist therein, the cylindrical structural member being mounted to the nuclear reactor container by means of a second supporting structural member. The inertial resisting force produced when the liquid metal existing in the annular gap will flow out from the annular gap in response to the vibration of the reactor core acts such as to suppress the vibration of the reactor core, thereby allowing an improvement in the anti-vibration properties of the fast breeder reactor.

20 Claims, 6 Drawing Figures

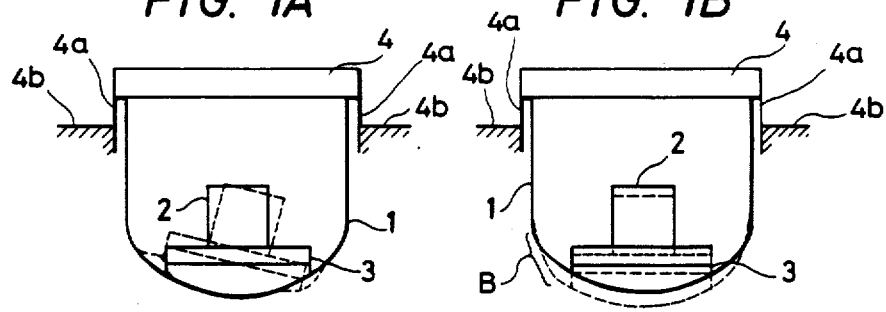
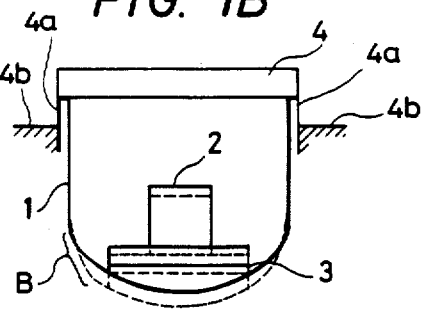
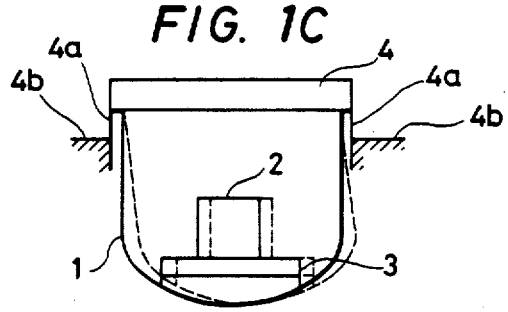
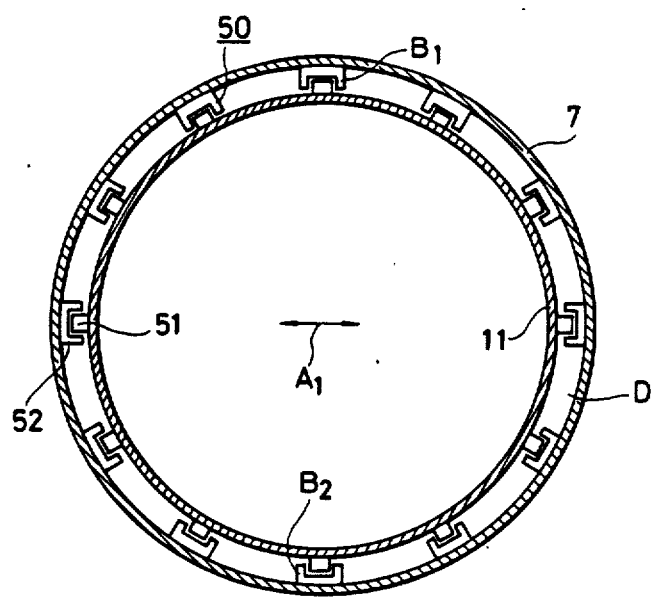

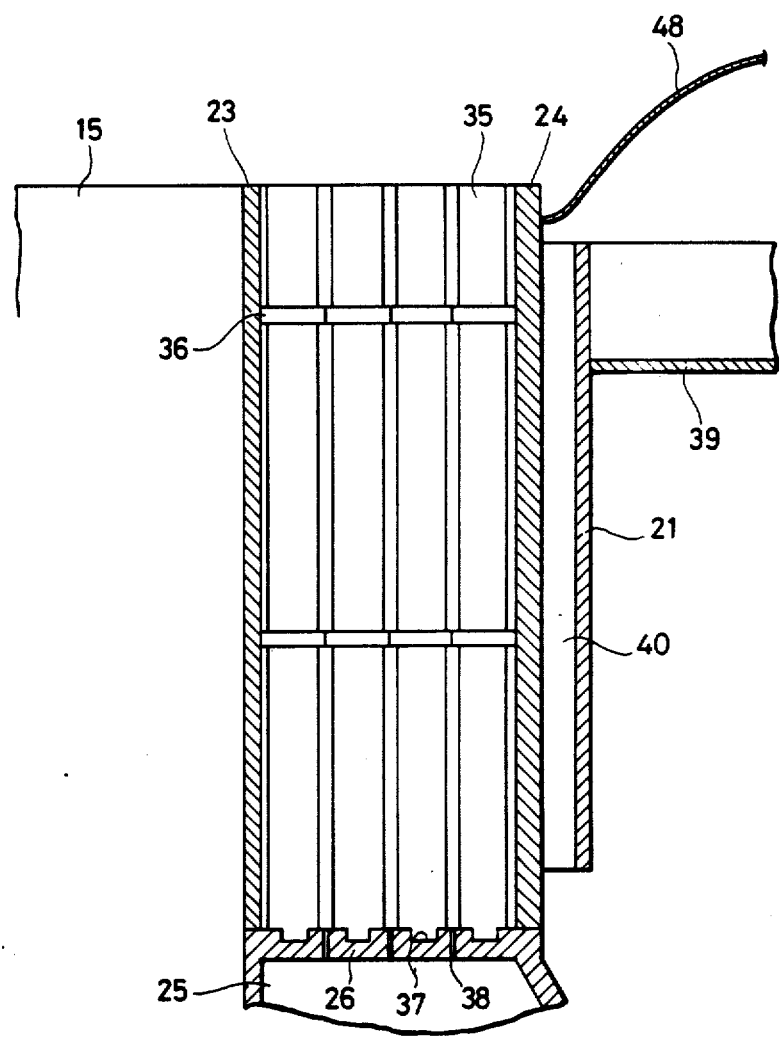

FAST BREEDER REACTOR

BACKGROUND OF THE INVENTION

(Field of the Invention)

The present invention relates to a fast breeder reactor and, more particularly, to a technique most suitable for use in a tank-type fast breeder reactor in which a reactor core is supported at an inner lower portion of the reactor container of a nuclear reactor.

A typical conventional tank-type fast breeder reactor (referred to simply as a "tank-type FBR", hereinafter) is arranged such that a reactor core, intermediate heat exchangers and circulation pumps are installed inside a nuclear reactor container known as a main container which contains sodium as a liquid metal. A roof slab having a rotational plug is attached to the upper end portion of the nuclear reactor container such as to cover the upper side thereof. The intermediate heat exchangers and the circulation pumps are mounted on the roof slab. The reactor core in which a multiplicity of fuel assemblies are disposed is supported by a core-supporting structural member which is mounted on the bottom portion of the nuclear reactor container. Examples of such core-supporting structure are respectively shown in FIG. 1 of the specification of Japanese Patent Laid-Open No. 15,895/1974, FIG. 1 of the specification of Japanese Patent Laid-Open No. 126,887/1979 and FIG. 1 of the specification of Japanese Patent Laid-Open No. 133,379/1982.

The core-supporting structural member in these examples is adapted to support the reactor core and to apply the load of the reactor core to the pressure vessel of a nuclear reactor. The core-supporting structural member has a tapered shape, such as a truncated cone shape, in cross-section in order to support the reactor core stably.

Even if the core-supporting structural member is formed into a specific cross-sectional configuration as described above, it is still preferable to take a measure to suppress the generation of vibration due to an exciting force produced by, for example, an earthquake, since the reactor core has a large weight and a center of gravity which is located higher than the core-supporting structural member.

SUMMARY OF THE INVENTION

(Object of the Invention)

Accordingly, a primary object of the invention is to suppress the vibration of the reactor core of a fast breeder reactor.

(Feature of the Invention)

According to a first aspect of the invention, there is provided a fast breeder reactor having a nuclear reactor container filled with a liquid metal, a reactor core disposed within the nuclear reactor container, and a first supporting structural member mounted to the nuclear reactor container such as to support the reactor core, characterized by comprising: a cylindrical structural member which surrounds the periphery of the reactor core such as to define an annular gap between the cylindrical structural member and the reactor core for allowing the liquid metal to exist therein, the cylindrical structural member being mounted to the nuclear reactor container by means of a second supporting structural member.

Further, according to a second aspect of the invention, there is provided in a tank-type fast breeder reactor having a nuclear reactor container filled with a liquid metal, a reactor core disposed within the reactor core container, a roof slab mounted on the upper portion of the nuclear reactor container, a core upper mechanism which is mounted on the roof slab and inserted into the nuclear reactor container, heat exchangers and circulation pumps, a fast breeder reactor characterized by comprising: a first supporting structural member for supporting the reactor core, the first supporting structural member being mounted on the bottom portion of the nuclear reactor container; a cylindrical structural member which surrounds the periphery of the reactor core such as to define an annular gap between the cylindrical structural member and the reactor core for allowing the liquid metal to exist therein, the cylindrical structural member being mounted to the nuclear reactor container by means of a second supporting structural member; and a partition wall which separates the inside of the nuclear reactor container into a low-temperature plenum and a high-temperature plenum, the partition wall being disposed above the cylindrical structural member and between an outer shroud of the reactor core and the nuclear reactor container.

BRIEF DESCRIPTION OF THE DRAWINGS

FIG. 1A is a skeleton view showing a rocking mode of the reactor core of a fast breeder reactor;

FIG. 1B is a skeleton view showing a vertical vibration mode of the reactor core of the fast breeder reactor;

FIG. 1C is a skeleton view showing a lateral vibration mode of the reactor core of the fast breeder reactor;

FIG. 3 is a detailed enlarged sectional view of a portion of the tank-type FBR shown in FIG. 2 indicated by the arrow A for describing the embodiment of the invention; and FIG. 4 is a sectional view of the tank-type FBR shown in FIG. 2 as viewed in the direction of the arrows IV—IV, particularly showing the relationship between a guard vessel, a nuclear reactor container and shear keys in FIG. 2 for describing the embodiment of the invention.

DETAILED DESCRIPTION OF THE PREFERRED EMBODIMENT

Figure 2:
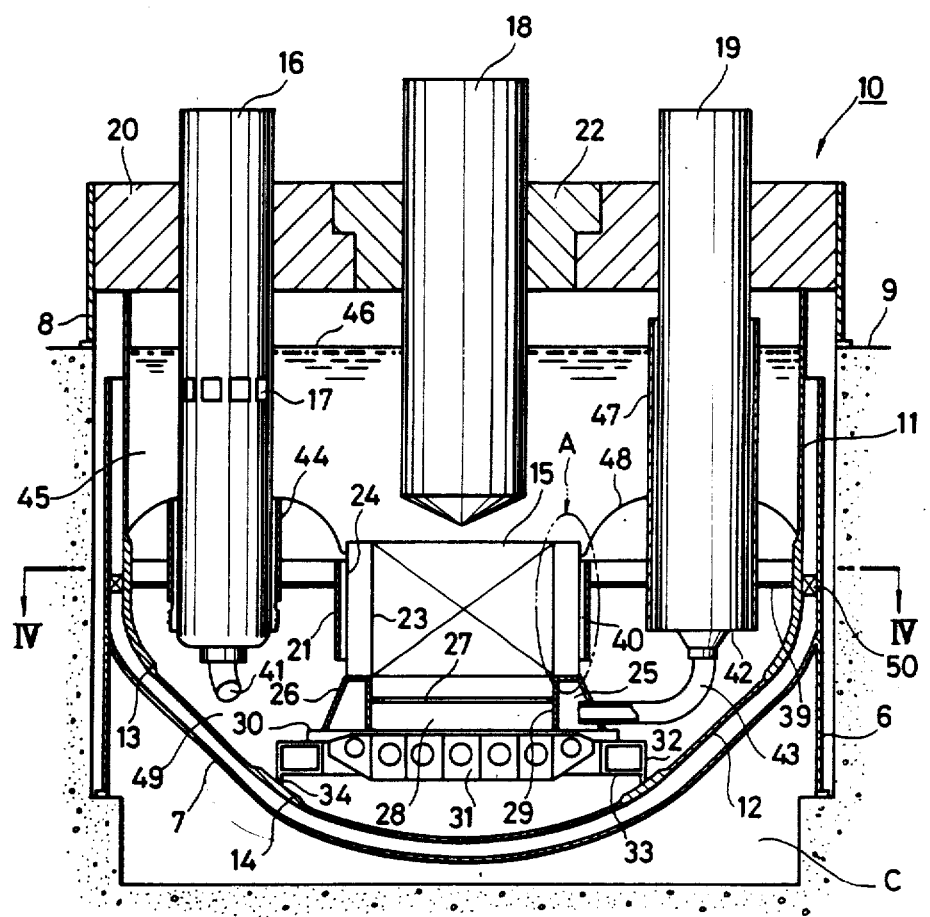
FIG. 2 is a vertical sectional view of a tank-type FBR in accordance with an embodiment of the invention.

A typical conventional tank-type FBR is arranged such that a reactor core 2 is disposed inside a nuclear reactor container 1 filled with liquid sodium and the reactor core 2 is installed on a core-supporting structural member 3 which is mounted on the bottom surface of the nuclear reactor container 1. The reference numeral 4 denotes a roof slab which covers the upper side of the nuclear reactor container 1. The roof slab 4 has a bracket 4a secured to the outer peripheral portion thereof. The bracket 4a is further secured to a peripheral structure 4b. To the roof slab 4 is secured the upper portion of the nuclear reactor container 1. Thus, the nuclear reactor container 1 is supported in a suspended fashion.

When the tank-type FBR in the state described above is subjected to an exciting force produced by an earthquake, the nuclear reactor container 1 and the reactor core 2 vibrate as shown in FIGS. 1A, 1B and 1C. In all of these Figures, the solid line shows the reactor core container 1 and the reactor core 2 in a normal state, while the broken line shows the nuclear reactor container 1 and the reactor core 2 in the state in which they are subjected to an exciting force produced by an earthquake.

The present invention has been accomplished on the basis of the results of examination of the vibrational phenomena of the reactor core 2 which are respectively shown in FIGS. 1A, 1B and 1C.

FIG. 1A shows rocking of the reactor core 2. The rocking of the reactor core 2 is such a movement that the nuclear reactor container 1 is locally deformed about the joint between the bottom portion of the nuclear reactor container 1 and the core-supporting structural member 3, thus causing the reactor core 2 to oscillate its top side to side with the center of the core-supporting structural member 3 as a node as if the reactor core 2 were an inverted pendulum. In other words, the top portion of the reactor core 2 is displaced in both vertical and horizontal directions by the rocking of the reactor core 2.

FIG. 1B shows a vertical vibration mode of the reactor core 2. The vertical vibration mode is caused due to the fact that a portion B of the nuclear reactor container 1 which is between a curvature starting portion thereof and the joint between the core-supporting structural member 3 and the nuclear reactor container 1 has a relatively low rigidity in the vertical direction.

Further, FIG. 1C shows a latteral vibration mode of the reactor core 2. The latteral vibration mode is caused due to the fact that the side wall of the nuclear reactor container 1 has a relatively low rigidity in the horizontal direction.

In an embodiment of the invention, it is intended to eliminate, first of all, the rocking of the reactor core 2 among the above-described vibrations. The invention has been accomplished through the discovery that it is the best practice to apply a vibration-damping effect by means of a fluid for elimination of the rocking of the reactor core 2.

A tank-type FBR in accordance with one preferred embodiment of the invention will be described hereinunder with reference to FIG. 2.

A tank-type FBR 10 shown in FIG. 2 is constructed as follows.

A support 8 is secured to a concrete floor surface of a building which houses the tank-type fast breeder reactor 10. The support 8 is integrated with a roof slab 20. To the roof slab 20 is secured the upper portion of a nuclear reactor container 11 which is disposed within a pit C formed in the floor surface 9.

The nuclear reactor container 11 is provided therein with intermediate heat exchangers 16 and circulation pumps 19 which are secured to the roof slab 20. The nuclear reactor container 11 has a bottom head which includes knuckle portions 13, 14 larger in thickness than the other portions of the bottom head 12. The bottom portion of the bottom head 12 which is below the knuckle portion 14 is spherical. On the other hand, the portion of the bottom head 12 between the knuckle portions 13 and 14 is conical. Further, the portion of the nuclear reactor container 11 which is above the knuckle portion 13 is cylindrical.

The lower portion of the nuclear reactor container 11 is covered with a guard vessel 7 which is disposed within the pit C. The guard vessel 7 is secured to the upper portion of a skirt 6 which is secured to the lower portion of the pit C. Between the guard vessel 7 and the nuclear reactor container 11 is formed an annular gap D as shown in FIG. 4.

A reactor core 15 has a core inner shroud 23 and a core outer shroud 24 which are disposed concentrically with each other. The reactor core 15 has a multiplicity of fuel assemblies, blanket fuel assemblies and neutron shielding members which are disposed within the core inner shroud 23. The reactor core 15 further has a multiplicity of neutron shielding members 35 which are made of a stainless steel as well as being solid, the neutron shielding members 35 being disposed between the core inner shroud 23 and the core outer shroud 24 as shown in FIG. 3. The core inner shroud 23 and the core outer shroud 24 are mounted on the upper end of a high-pressure plenum casing 26 which is formed therein with a mixing chamber 25. The neutron shielding members 35 are, as shown in FIG. 3, installed by being inserted in respective recesses 37 provided in the upper surface of the high-pressure plenum casing 26. The multiplicity of neutron shielding members 35 are in close contact with one another in a lattice shape within the gap between the core inner shroud 23 and the core outer shroud 24. The distance between the adjacent neutron shielding members 35 is properly maintained by means of a pad 36 provided therebetween. The high-pressure plenum casing 26 is provided in the upper surface thereof with an opening 38 for supplying sodium for cooling into each area between the adjacent neutron shielding members 35.

A fuel supporting plate 27 is mounted on the inner side wall of the high-pressure plenum casing 26. The multiplicity of fuel assemblies disposed within the core inner shroud 23 are supported by the fuel supporting plate 27. The lower end of the high-pressure plenum casing 26 is mounted on a base plate 30. A high-pressure plenum 28 is defined by being surrounded with the inner side wall of the high-pressure plenum casing 26, the fuel supporting plate 27 and the base plate 30. A multiplicity of openings 29 provided in the inner side wall of the high-pressure plenum casing 26 provide communication between the mixing chamber 25 and the high-pressure plenum 28.

The base plate 30 is constructed such that the peripheral edge portion thereof has a relatively large thickness and the central portion thereof has a relatively small thickness in order to reduce a thermal stress generated due to a temperature difference in the thicknesswise direction of the base plate 30. To the lower surface of the thin-wall portion of the base plate 30 is welded a reinforcing rib 31 which is constituted by thin-wall ribs arranged in a lattice. Accordingly, the base plate 30 is capable of enduring a pressure of about 5 to 8 Kg/cm² in the high-pressure plenum 28.

A core-supporting structural member 32 is composed of a ring guarder 33 and a cylindrical skirt 34. The skirt 34 is welded to the lower surface of the ring guarder 33. The lower end of the skirt 34 is bonded to the knuckle portion 14 of the bottom head 12. The thick-wall portion constituting the outer edge portion of the base plate 30 is mounted to the ring guarder 33 by means of bolts.

A cylindrical vibration-damping shroud 21 is disposed outside the core outer shroud 24 concentrically therewith. The vibration-damping shroud 21 is attached to a tabular and ring-shaped horizontal redan 39 mounted to the knuckle portion 13 of the nuclear reactor container 11. An annular gap 40 is defined between the vibration-damping shroud 21 and the core outer shroud 24.

A core upper mechanism (control rod driving device, etc.) 18 is mounted on a rotational plug 22 rotatably installed in the central portion of the roof slab 20. Six intermediate heat exchangers 16 and four circulation pumps 19 are mounted on the roof slab 20 on the same circumference. The respective lower end portions of the intermediate heat exchangers 16 and the circulation pumps 19 extend through the horizontal redan 39 to reach a level below the horizontal redan 39. The reference numeral 17 denotes an inlet in each intermediate heat exchanger 16, while the numeral 41 represents an outlet of the intermediate heat exchanger 16. A cylindrical heat-insulating wall 44 is mounted on the horizontal redan 39 such as to surround the periphery of each intermediate heat exchanger 16. A cylindrical heat-insulating wall 47 having the upper end thereof projecting above the level 46 of the liquid sodium is mounted on the horizontal redan 39 such as to surround the periphery of each circulation pump 19. A piping 43 joined to the outlet of each circulation pump 19 is connected to the mixing chamber 25. The reference numeral 42 denotes an inlet of each circulation pump 19. A partition wall 48 having an upwardly convex toroidal cross-section has the inner periphery attached to the core outer shroud 24 and the outer periphery thereof attached to the nuclear reactor container 11 and additionally respective intermediate portions thereof attached to the heat-insulating walls 44, 47. Although not shown, a heat-insulating wall is located immediately below the partition wall 48. The partition wall 48 separates the inside of the nuclear reactor container 11 into an upper portion constituting a high-temperature plenum 45 in which high-temperature sodium exists and a lower portion constituting a low-temperature plenum 49 in which low-temperature sodium exists.

The sodium (the primary-system sodium) raised in temperature by being heated when passing through the fuel assemblies in the reactor core 15 is discharged into the high-temperature plenum 45 from the reactor core 15. This high-temperature sodium is supplied from the inlet 17 into the shell of each intermediate heat exchanger 16 and is subjected to heat exchange with the secondary-system sodium which is supplied into the heat exchanger tube (not shown) of the intermediate heat exchanger 16. More specifically, the primary-system sodium flowing into the inside of the intermediate heat exchanger 16 from the inlet 17 is lowered in temperature as the result of heating the secondary-system sodium. The secondary-system sodium raised in temperature and discharged from the heat exchanger tube is introduced into a steam generator (not shown), thus causing the feed water supplied into the steam generator to be heated so as to evaporate. The secondary-system sodium lowered in temperature through heat exchange and discharged from the steam generator is supplied into the heat exchanger tube of each intermediate heat exchanger 16 again.

The primary-system sodium lowered in temperature is discharged into the low-temperature plenum 49 from the outlet 41 of the intermediate heat exchanger 16. The low-temperature sodium in the low-temperature plenum 49 is introduced into each circulation pump 19 through the inlet 42 thereof and is raised in pressure therein and is then discharged into the piping 43. This sodium having high pressure and low temperature is introduced into the mixing chamber 25. The mixing chamber 25 mixes together the sodium discharged from each circulation pump 19 so that the sodium is uniformed in temperature and pressure. The sodium is then supplied into the high-pressure plenum 28 from the mixing chamber 25 through the multiplicity of openings 29. The sodium in the high-pressure plenum 28 is introduced into the fuel assemblies (not shown) mounted on the fuel supporting plate 27. A portion of the sodium in the mixing chamber 25 is supplied into each area between the adjacent neutron shielding members 35 through the corresponding opening 38. This portion of sodium is employed to cool the neutron shielding members 35 in order to prevent the neutron shielding members 35 from being overheated by the radioactive rays absorbed thereby.

Moreover, shear keys 50 are provided between the nuclear reactor container 11 and the guard vessel 7. The shear keys 50 are disposed such as to exactly face the joint between the horizontal redan 39 and the nuclear reactor container 11. Each shear key 50 is constituted by a key 51 and a lug 52. A multiplicity of shear keys 50 are, as shown in FIG. 4, installed around the nuclear reactor container 11. FIG. 4 shows in detail how the shear keys 50 are disposed. The keys 51 are mounted on the outer surface of the nuclear reactor container 11, while the lugs 52 are mounted on the inner surface of the guard vessel 7. The keys 51 are respectively fitted in the recesses which are respectively formed in the lugs 52 such as to extend in the axial direction of the nuclear reactor container 11. When an exciting force produced by an earthquake is applied in the directions of the arrow A1 in FIG. 4, the swing of the nuclear reactor container 11 is suppressed by the shear keys 50 (e.g., the shear keys respectively located at the points $B_1$, $B_2$) which exist in the direction orthogonal to the direction of the arrow A1. More specifically, the swing of the nuclear reactor container 11 is suppressed, since the movements of the keys 51 of the shear keys 50 respectively located at the points $B_1$, $B_2$ are restricted by the associated lugs 52.

The following is a description of the vibration-damping effect of this embodiment obtained by the provision of the vibration-damping shroud 21. The following description will be made on the assumption that the nuclear reactor container 11 is swung by an earthquake in the directions of the arrow A1 in FIG. 4.

When the nuclear reactor container 11 is subjected to acceleration in a direction which is horizontal and parallel to the direction of the arrow A1 in the case of an earthquake, the fuel assemblies and other members in the reactor core 15 would vibrate in the directions of the arrow A1. The force by which the fuel assemblies and other members would be vibrated is transmitted to the core inner shroud 25, the pads 36 between the neutron shielding members 35, and the core outer shroud 24 and is counteracted by the core outer shroud 24 in the end. The force counteracted by the core outer shroud 24 causes the reactor core 15 to rock.

The vibration-damping shroud 21 is horizontally supported by the horizontal redan 39, the nuclear reactor container 11, the shear keys 50, the guard vessel 7 and the skirt 6 and therefore is adapted not to vibrate horizontally. Moreover, the annular gap 40 is filled with sodium. Accordingly, in the case of an earthquake, the reactor core 15 cannot perform rocking in which the reactor core 15, together with the core outer shroud 24, swings the top portion thereof side to side with the core-supporting structural member 32 as a fulcrum as if the reactor core 15 were an inverted pendulum as shown in FIG. 1A, unless the reactor core 15 pushes out the liquid sodium existing in the annular gap 40 therefrom. The liquid sodium in the annular gap 40 cannot move with the vibration of the reactor core 15, since the vibration frequency of the reactor core 15 is six to eight Hertz, which is higher than the rate at which the sodium in the annular gap 40 is pushed out therefrom. Thus, the liquid sodium in the annular gap 40 which is produced as the result of employing the vibration-damping shroud 21 favorably suppresses the rocking of the reactor core 15. In other words, there is provided a vibration-damping effect for the reactor core 15 which is obtained on the basis of inertia resistance of the liquid sodium in the annular gap 40. This vibration-damping effect is correspondingly deteriorated as the width of the annular gap 40 increases. It has been, however, confirmed that it is possible to obtain the required vibration-damping effect when the width of the annular gap 40 is not greater than 10% of the radius of the core outer shroud 24. For this reason, the width of the annular gap 40 is required to be not greater than 10% of the radius of the core outer shroud 24.

The provision of the vibration-damping shroud 21 makes it possible to absorb any difference in thermal displacement among the structural members, from the reactor core 15 to the nuclear reactor container 11, due to a temperature difference therebetween. More specifically, the temperatures of the reactor core 1 and the core outer shroud 21 rise to about 500° C., while the temperatures of the vibration-damping shroud 21, the horizontal redan 39 and the nuclear reactor container 11 rise to about 360° C. Therefore, an arrangement in which the vibration-damping shroud 21 is not provided and the horizontal redan 39 and the core outer shroud 24 are directly connected together would cause an increase in thermal stress in the horizontal redan 39 and the nuclear reactor container 11 due to radial thermal expansion of both the reactor core 15 and the core outer shoroud 24, which is not preferable from the viewpoint of health of the structural members. In the embodiment, however, the annular gap 40 is interposed between the core outer shroud 24 and the vibration-damping shroud 21; therefore, any radial thermal expansion of the reactor core 15, for example, can easily be absorbed by the annular gap 40. Accordingly, there is no possiblity that a large stress such as the mentioned above resulting in radial thermal expansion of the reactor core 15 may be generated in the horizontal redan 39 and the nuclear reactor container 11. Further, since the core outer shroud 24 and the vibration-damping shroud 21 are separate from each other, the heat of the reactor core 15 is not directly transmitted to the horizontal redan 39, so that an extremely large temperature difference is not produced between the portion of the horizontal redan 39 which is closer to the reactor core 15 and the portion of the horizontal redan 39 which is closer to the nuclear reactor container 11. For this reason, no thermal stress is generated in the horizontal redan 39.

Furthermore, the temperature of the guard vessel 7 is 200° C.; consequently, a temperature difference of about 160° C. is produced between the nuclear reactor container 11 and the guard vessel 7. However, any thermal expansion difference between both the structural members due to this temperature difference can be absorbed by the shear keys 50. In other words, any radial thermal expansion of the nuclear reactor container 11 is absorbed by the gap which exists in the radial direction of the nuclear reactor container 11 and between the key 51 and the associated lug 52 of each of the shear keys 50.

The nuclear reactor container 11 in accordance with the embodiment is increased in rigidity in the axial direction thereof by forming a portion of the bottom head 12 into a conical shape and selecting the plate thickness of the knuckle portion 14 to be about two to three times as much as that of the bottom head 12. In this embodiment, accordingly, it is possible to reduce the vertical displacement of the reactor core 15 shown in FIG. 1B. More specifically, the reactor core 15 is supported by the bottom head 12 of the nuclear reactor container 11 through the core-supporting structural member 32. The rigidity required for suppressing the vertical vibration of the reactor core 15 is born by the portion of the bottom head 12 which exists from the lower end of the cylindrical portion of the nuclear reactor container 11 to the skirt 34 of the core-supporting structural member 32. This rigidity depends on the configuration of the bottom head 12 a portion of which is constituted by a conical wall. It has been found as the result of an analysis that the configuration of the bottom head 12 in accordance with the embodiment makes it possible to obtain the highest rigidity.

In other words, the configuration of the bottom head 12 in accordance with the embodiment makes it possible to obtain a high spring constant required for vertically supporting the nuclear reactor container 15 and consequently to increase the frequency of vertical vibration of the reactor core 15. The amplitude is inversely proportional to the square of the vibration frequency. For instance, the amplitude of pitching becomes one per 2.25 time with a 1.5-fold increase of the vibration frequency. Such a reduction in amplitude of pitching decreases the relative displacement amount between the reactor core 15 supported by the lower end portion of the nuclear reactor container 11 and the control rod driving device (not shown) mounted on the roof slab 20 which is installed on the upper end portion of the nuclear reactor container 11, thereby making it possible to minimize a fluctuation in reactivity control of the reactor core 15 caused by an earthquake. More specifically, if there is a difference in the relative displacement amount in the vertical direction between the reactor core 15 and the control rod driving device in the case of an earthquake, the amount of insertion of the control rod held by the control rod driving device into the reactor core 15 changes in correspondence to the vertical vibration of the reactor core 15 caused by the earthquake. In other words, with respect to the reactor core 15, the control rod is inserted into the reactor core 15 and withdrawn therefrom in response to the vertical vibration of the reactor core 15 caused by the earthquake. As the vertical relative displacement amount between the reactor core 15 and the control rod driving device increases, there is an increase in the amount of withdrawal of the control rod when the reactor core 15 and the control rod driving device move in the opposite directions, resulting in a correspondingly large positive reactivity. In this embodiment, however, the amplitude of vertical vibration of the reactor core 15 is reduced as described above, and therefore, the relative displacement amount between the reactor core 15 and the control rod driving device is reduced, and the positive reactivity added by an earthquake is reduced correspondingly. In particular, since it is possible to prevent rocking of the reactor core 15 as described above, it is also possible to eliminate the vertical vibration of the reactor core 15 based on the rocking thereof. Accordingly, the vertical relative displacement amount between the reactor core 15 and the control rod driving device becomes extremely small, so that the positive reactivity produced in the reactor core 15 in the case of an earthquake is greatly reduced.

The partition wall 48 in accordance with the embodiment has an upwardly convex toroidal cross-section. For this reason, the partition wall 48 is advantageously resistant to the vibratory pressure of sodium applied to the upper and lower surfaces of the partition wall 48 in the case of an earthquake despite that the partition wall 48 has a soft structure which makes it possible to absorb any difference in thermal displacement between the reactor core 15 and the nuclear reactor container 11.

Further, when it becomes impossible to cool the primary-system sodium in the intermediate heat exchangers 16 due to, for example, the trip of a secondary-system pump connected to the intermediate heat exchangers 16, the high-temperature sodium is discharged into the low-temperature plenum 49 from the outlet 41 of each intermediate heat exchanger 16, thus causing a so-called hot shock. In such case, the embodiment advantageously makes it possible to fairly allow the deformation of the horizontal redan 39 due to a sudden temperature change in the low-temperature plenum 49.

The partition wall 48 may be formed into a tabular shape instead of the upwardly convex toroidal cross-section such as that shown in FIG. 2.

Moreover, the present invention is applicable to the nuclear reactor container of not only a tank-type FBR but also a loop-type FBR.

According to the above-described embodiment, it is possible to suppress the rocking and pitching of the reactor core.

What is claimed is:

1. A fast breeder reactor comprising:
   a nuclear reactor container filled with a liquid metal;
   a reactor core disposed within said nuclear reactor container;
   a first supporting structural member mounted to a first position of said nuclear reactor container so as to support said reactor core;
   a cylindrical structural member surrounding the periphery of said reactor core so as to define an annular gap between said cylindrical structural member and said reactor core for allowing said liquid metal to fully exist therein, said cylindrical structural member being independent of said reactor core and said first structural member; and
   a second supporting structural member mounted to a second position of said nuclear reactor container so as to support said cylindrical structural member, said second position of said nuclear reactor container being substantially apart from said first position.

2. A fast breeder reactor according to claim 1, wherein said nuclear reactor container includes a first portion having a cylindrical shape, a second portion connected to the lower side of said first portion and having a partially conical shape, and a third portion connected to the lower side of said second portion and having a partially spherical shape.

3. A fast breeder reactor according to claim 2, further comprising a guard vessel member surrounding and spaced from said first, second and third portions of said nuclear reactor container so as to delimit a gap therebetween, and means disposed in said gap in the region of said first portion of said nuclear reactor container for enabling coupling of said nuclear reactor container and said guard vessel member to supress swinging movement of said nuclear reactor container.

4. A fast breeder reactor according to claim 3, wherein said cylindrical structural member is tabular and ring-shaped and mounted to said nuclear reactor container around the position where said means for enabling coupling of said nuclear reactor container and said guard vessel member are provided.

5. A fast breeder reactor according to claim 2, wherein said nuclear reactor container has a structure in which the thickness of a first region of said nuclear reactor container between said first and second portions and the thickness of a second region of said nuclear reactor container between said second and third portions are made larger than the thickness of the portions of said nuclear reactor container which are adjacent said first and second regions, said first supporting structural member for supporting said reactor core is mounted to said second region of said nuclear reactor container, and said second supporting structural member is mounted to said first region of said reactor container.

6. A fast breeder reactor according to claim 1, wherein the width of said annular gap is selected to be not greater than 1/10 of the radius of said reactor core.

7. A fast breeder reactor according to claim 1, wherein said second supporting structural member is tabular and ring-shaped and horizontally supports said cylindrical structural member.

8. In a tank-type fast breeder reactor having a nuclear container filled with a liquid metal, a reactor core disposed within said nuclear reactor container and having an outer shroud, a roof slab mounted on the upper portion of said nuclear reactor container, a core upper mechanism which is mounted on said roof slab and inserted into said nuclear reactor container, a heat exchanger, a circulation pump, and a first supporting structural member for supporting said reactor core, said first supporting structural member being mounted on the bottom portion of said nuclear reactor container, the improvement comprising:
   a cylindrical structural member vertically extending and surrounding the periphery of said reactor core so as to define an annular gap between said cylindrical structural member and said outer shroud of said reactor core for allowing said liquid metal to fully exist therein, said cylindrical structural member being independent of said first supporting structural member and mounted to said nuclear container by a second supporting structural member at a position different from the position at which said first supporting structural member is mounted; and
   a partition wall separating the inside of said nuclear reactor container into a low-temperature plenum and a high-temperature plenum, said partition wall being disposed above said cylindrical structural member and between said outer shroud of said reactor core and said nuclear reactor container.

9. A fast breeder reactor according to claim 8, wherein said nuclear reactor container includes a first portion having a cylindrical shape, a second portion connected to the lower side of said first portion and having a partially conical shape, and a third portion connected to the lower side of said second portion and having a partially spherical shape.

10. A fast breeder reactor according to claim 9, further comprising a guard vessel surrounding and spaced from said first, second and third portions of said nuclear reactor container so as to delimit a gap therebetween, and means disposed in said gap in the region of said first portion of said nuclear reactor container for enabling coupling of said nuclear reactor container and said guard vessel member to suppress swinging movement of said nuclear reactor container.

11. A fast breeder reactor according to claim 10, wherein said partition wall is connected to said first portion of said nuclear reactor container, and said coupling means are disposed in said gap in the region of the connection of said partition wall to said first portion of said nuclear reactor container.

12. A fast breeder reactor according to claim 9, wherein said nuclear reactor container has a structure in which the thickness of a first region of said nuclear reactor container between said first and second portions and the thickness of a second region of said nuclear reactor container between said second and third portions are made larger than the thickness of the portions of said nuclear reactor container which are adjacent to said first and second regions, said first supporting structural member for supporting said reactor core is mounted to said second region of said nuclear reactor container, and said second supporting structural member is tabular and ring-shaped and horizontally mounted to said first region of said nuclear reactor container.

13. A fast breeder reactor according to claim 8, wherein said partition wall has a toroidal shape.

14. A fast breeder reactor according to claim 8, wherein the width of said annular gap is no greater than 1/10 of the radius of said reactor core.

15. A fast breeder reactor comprising:
- a nuclear reactor container filled with a liquid metal, and having a bottom head;
- a reactor core disposed within said nuclear reactor container, and having a core inner shroud and a core outer shroud;
- a core supporting structural member mounted to a first position of said bottom heasd of said nuclear reactor container so as to support said reactor core;
- a vibration damping shroud surrounding said core outer shroud so as to define an annular gap between said core outer shroud and said vibration damping shroud, said annular gap being fully filled with the metal liquid; and
- a tubular ring-shaped horizontal member the inner side of which is mounted to said vibration damping shroud and the outer side to a second position of said nuclear reactor container so as to horizontally support said vibration damping shroud, said second position of said container being above said first position of said bottom head.

16. A fast breeder reactor according to claim 15, wherein said nuclear reactor container includes a cylindrically shaped portion, a partially conically shaped portion continued from the lower side of said cylindrical shaped portion, and a partially spherically shaped portion continued from the lower side of said partially conically shaped portion, said tabular and ring-shaped horizontal member being mounted to said cylindrically shaped portion, and said core supporting structural member being mounted on said first position between said partially conically shaped portion and said partially spherically shaped portion.

17. A fast breeder reactor according to claim 16, wherein said nuclear reactor container is thicker at said first and second positions than at the outer portions.

18. A fast breeder reactor according to claim 17, further including a guard vessel member surrounding and spaced from said nuclear reactor container to form a gap therebetween, and a plurality of shear keys are disposed in said gap and arranged circumferentially at said second position of said nuclear container.

19. A fast breeder reactor comprising:
- a support standing on a concrete floor surface of a building;
- a roof slab integrated with said support at the upper portion;
- a nuclear reactor container the upper portion of which is secured to said roof slab so as to be suspended therefrom in a pit formed in said floor surface, said nuclear container being filled with a metal fluid and having a bottom head which includes first and second knuckle portions larger in thickness than other portions of said nuclear container, said first knuckle portion being positioned above said second knuckle portion;
- a core upper mechanism mounted on a plug installed in the central portion of said roof slab to be positioned over said reactor core;
- intermediate heat exchangers mounted on said roof slab so as to surround said core upper mechanism;
- circulation pumps mounted on said roof slab;
- a reactor core disposed within said nuclear reactor container and having a core inner shroud and a core outer shroud which are disposed concentrically with each other;
- a core supporting structural member mounted to said second knuckle portion of said bottom head;
- a cylindrical vibration-damping shroud disposed outside said core shroud concentrically therewith so as to define an annular gap between said vibration-damping shroud and said core outer shroud;
- a tabular and ring-shaped horizontal member mounted to said first knuckle portion at the outside thereof the inner side of said tabular and ring-shaped horizontal member being secured to said vibration damping shroud so as to horizontally support said vibration damping shroud; and
- a partition wall, having an inner periphery attached to said core outer shroud and an outer periphery attached to said nuclear reactor container, for separating the inside of said nuclear reactor container into an upper portion constituting a high-temperature plenum and a lower portion constituting a low-temperature plenum.

20. A fast breeder reactor according to claim 19, further comprising a guard vessel mounted on a lower portion of said pit, surrounding and spaced from said nuclear reactor container so as to delimit a gap therebetween, and a plurality of shear keys each disposed between and mounted to both said nuclear reactor container and said guard vessel at positions where said tabular and ring-shaped horizontal member is secured to said nuclear reactor container.

* * * * *